Jan. 13, 1953   R. L. MERRY   2,625,185
SAWING MACHINE WITH IMPROVED FEED ACTUATION
Filed May 26, 1950   4 Sheets-Sheet 1

Roy L. Merry
INVENTOR.

Roy L. Merry
INVENTOR.

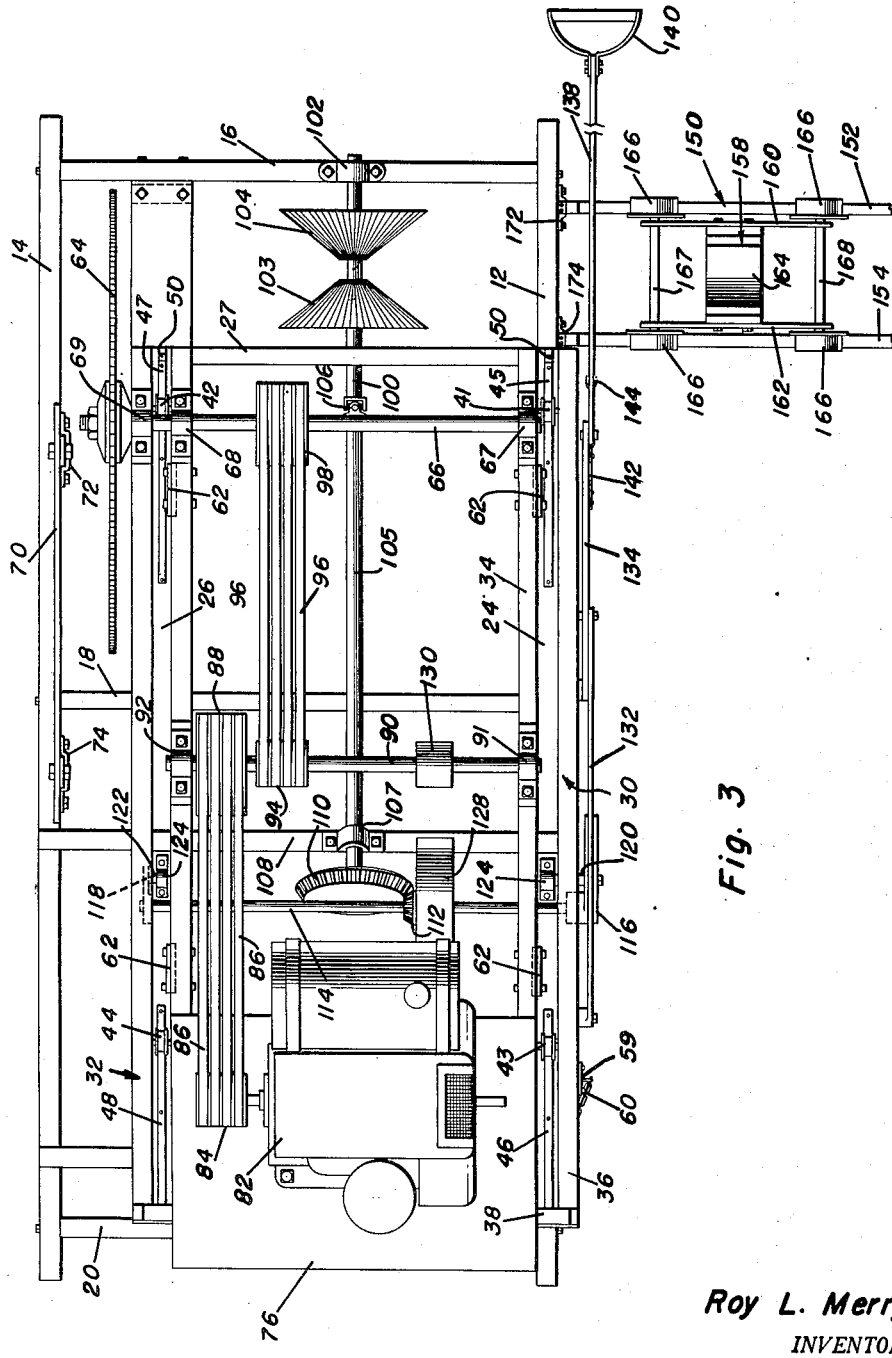

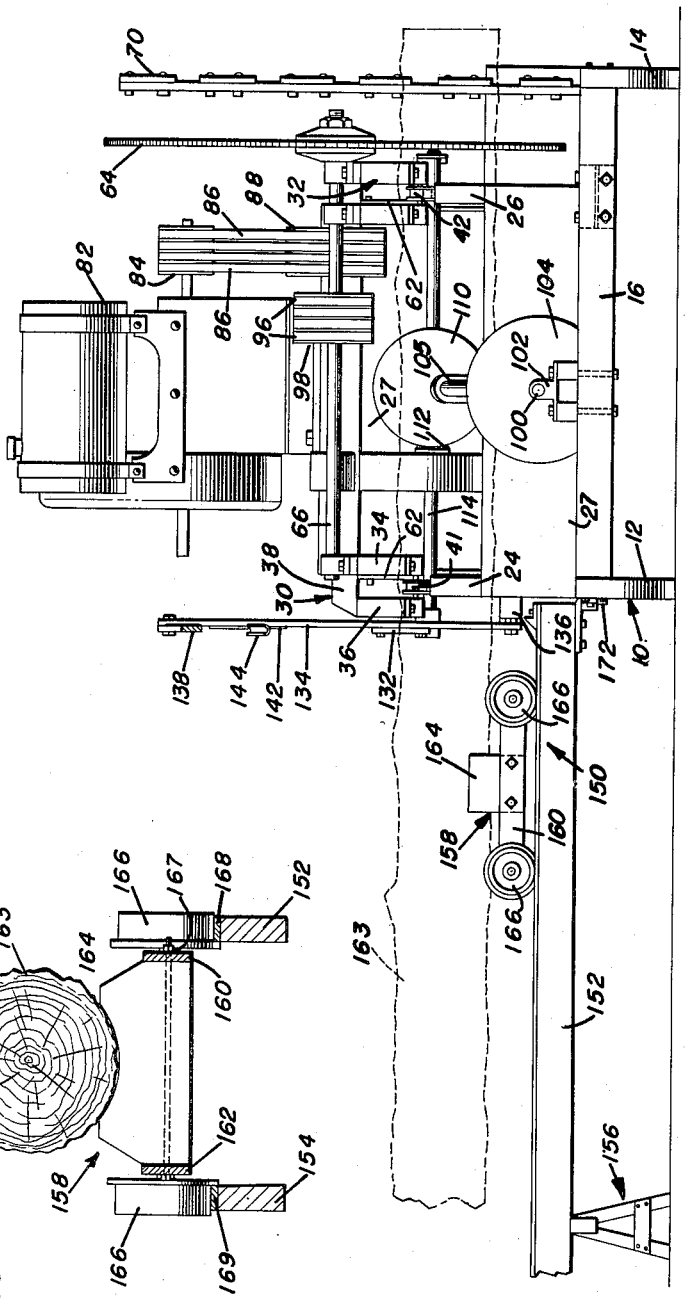

Patented Jan. 13, 1953

2,625,185

UNITED STATES PATENT OFFICE 2,625,185

SAWING MACHINE WITH IMPROVED FEED ACTUATION

Roy L. Merry, Milo, Maine

Application May 26, 1950, Serial No. 164,549

2 Claims. (Cl. 143—47)

This invention relates to improvements in log cutters of the portable type.

An object of this invention is to provide an improved device for cutting logs into shorter lengths, said device including a base which is mounted on runners so that it may be easily moved from one place to another, the base having a pair of horizontal and parallel rails which forms a means of supporting a carriage for end to end movement thereon, the carriage having an engine to operate a saw blade and also to provide power for operating a feed mechanism which directs logs to be cut in the path of travel of the saw, whereby upon operation of an improved linkage arrangement the carriage may be pulled forwardly to cut the log and when the carriage is moved forward, the feed mechanism is inoperative, but when the carriage is moved backward to thereby move the saw from the path of travel of the feed mechanism, said mechanism becomes operative so as to feed additional log into the path of travel of the saw blade for the next cut.

Other objects and features of importance will become apparent in following the description of the illustrated form of the invention.

In the drawings:

Figure 3 is a top view of the structure of Figure 1;

Figure 4 is an end view of the device; and

Figure 5 is a sectional view of a part of the feed mechanism with a log thereon.

Figure 1:
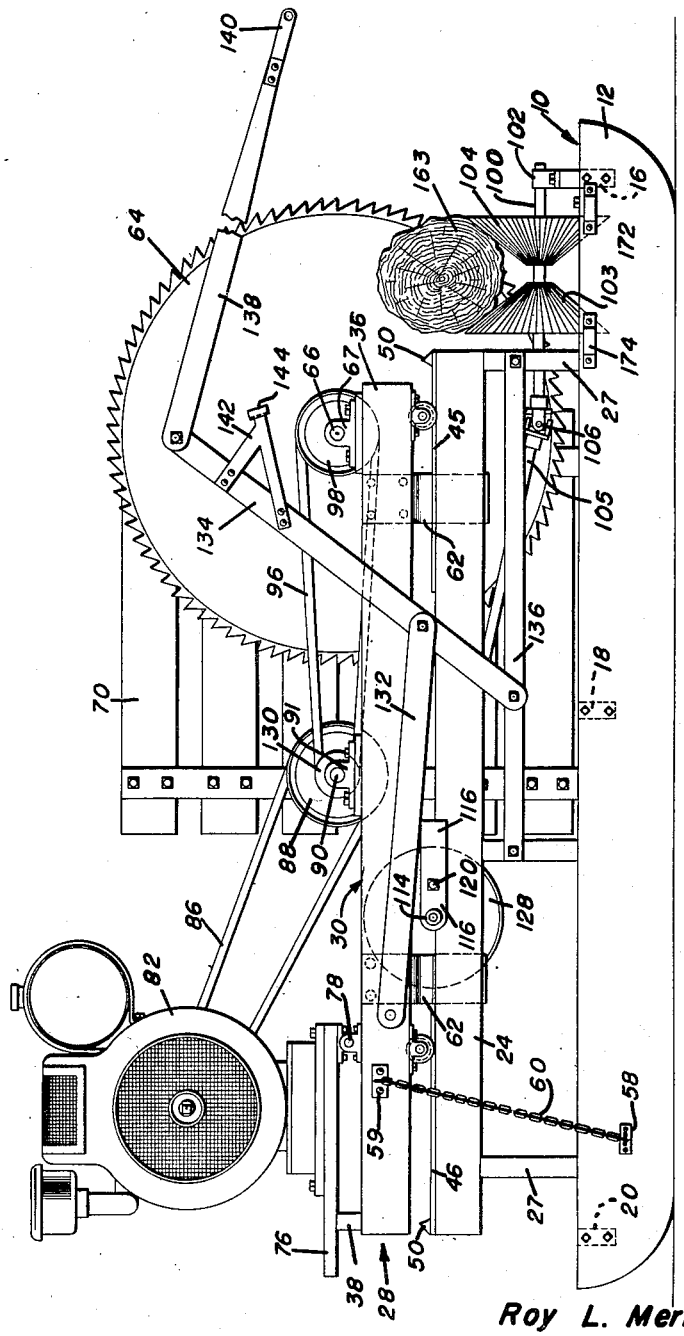
Figure 1 is a side view of the device showing a log being cut.

In carrying out the invention there is provided a base 10 which includes a pair of runners 12 and 14 which are held in parallel spaced relationship by means of spacer members or braces 16, 18 and 20. A pair of horizontal, parallel rails 24 and 26, respectively, are disposed on a number of structural members 27 forming a leg frame therefor. The structural members are attached to the runners by any conventional means and hold the rails in proper location with respect to each other.

A carriage 28 is disposed on the rails for sliding end to end movement thereon. The carriage consists of sides 30 and 32 (Figure 3) and each side is fabricated of a pair of longitudinal members, for example, the members 34 and 36 (see Figure 4) which are held in that relation by means of cross members 38. Disposed between the pairs of members forming the sides of the carriage are the rollers 41, 42, 43, and 44. (See Figure 3.) Each roller is mounted on a shaft and the shafts are carried in bearings (unnumbered) on the lower edges of said pairs of longitudinal members. The rollers are of the flanged type to ride properly on the straps 45, 46, 47 and 48, each strap having a stop 50 rising therefrom which is cooperative with the various wheels to limit the travel of the carriage on the rails. A chain 60 (Figures 1 and 2) or other flexible element is secured by the brackets 58 and 59 to the carriage 28 and the base 10 to also limit the movement of the carriage on the rails.

Four brackets, each of which is indicated at 62, are secured to the longitudinal members of the sides 30 and 32 of the carriage 28 and extend downwardly for engagement with the inside surfaces of the rails 24 and 26. The function of the brackets is to form guides to prevent lateral separation of the carriage and the rails.

A saw blade 64 is mounted on the shaft 66, said shaft being carried in the bearings 67, 68, and 69 (Figure 3) which are secured to the top surfaces of various longitudinal side members of the carriage. The shaft 66 extends transversely of the carriage and mounts the detachably supported blade in such a location that the guard fence 70 which is removably disposed in the brackets 72 and 74 protects an individual from injury which may be occasioned by touching the rotating saw blade. The brackets are secured to the runner 14 (Figure 3).

A platform 76 (Figures 1 and 2) is hinged, as by the hinge 78, at the front edge thereof to certain longitudinal members of the sides of the carriage and is provided with a support 38 at the rear end thereof which is also disposed on the sides 30 and 32 of the carriage. An engine 82 of conventional description is secured to the platform 76 and drives a multiple pulley 84 (Figures 3 and 4) which has a number of belts 86 entrained therearound. These belts extend around a multiple sheave 88 which is secured to the shaft 90, mounted in the bearings 91 and 92. The bearings are carried by the sides of the carriage so that the shaft 90 is displaceable with the carriage. A pulley assembly 94 is secured to the shaft 90 and is spaced from the multiple sheave 88. A number of belts 96 of conventional description are entrained around the pulley assembly 94 and also around a multiple pulley 98, which is fixed to the shaft 66. Through this train of elements, the engine causing operation of the multiple pulley 84 causes rotation of the saw blade 64 at all times while the engine is operative.

Shafting consisting of a horizontal shaft 100 mounted in bearings 102, is provided in order to operate the beveled and scored log feed rollers 103 and 104. These rollers are fixed to the shaft 100 and a shaft section 105 is connected with the shaft 100 by means of the universal joint 106. The shaft 105 is disposed at an angle with respect to the horizontal (Figure 1) and is supported in a bearing at its upper end which is carried by the cross member 108. The bearing 107 which is secured to this cross member fixes the shaft so that it does not move longitudinally with the carriage. In other words, the end to end movement of the carriage is independent of the shafting.

A gear 110 is fixed to the outer end of the shafting and has a pinion 112 enmeshed therewith. The pinion is fixed to the transverse shaft 114 which is capable of being displaced laterally. The means mounting the shaft 114 for this movement is seen by correlating Figures 1 and 3. A pair of cranks 116 and 118 are pivoted by means of pivot pins 120 and 122 to the rails 24 and 26, any suitable means, as the bearings 124, holding the pivot pins 120 and 122 fixed in a horizontal plane. The laterally displaceable shaft 114 is secured at its ends to said cranks or levers 118 and 120 so that when either of the levers 116 and 118 are pivoted, the shaft 114 is displaced laterally.

A rotating member, as the pulley 128, is fixed to the laterally displaceable shaft 114 and a rotating element, as the smaller pulley 130, is fixed to the shaft 90. Inasmuch as the shaft 90 is carried by the carriage and the shaft 114 is carried by the base, when the carriage is moved rearwardly as disclosed in Figure 2, the rotating member 128 contacts the rotating element 130 thereby causing operation of the shafting through the gears 110 and 112 in order to actuate the rollers 103 and 104.

The purpose of having the shaft 114 laterally displaceable is to insure a firm contact between the rotating member 128 and rotating element 130.

The means for lifting the shaft so that it may be displaced is seen best in Figure 1 and consists of a link 132 which is pivoted at one end to the carriage and which is pivoted at the other end to another link 134. The link 132 is disposed above the lever 116 so that when the carriage is moved to the farthest rear position (Figure 2) the link 132 contacts one end of the lever 116, causing it to pivot about the pins 120 and 122 as an axis thereby lifting the shaft 114 which is supported at the end of the levers opposite from the end of lever 116 which is contacted by the link 132.

The means of operating the shaft 114 in a laterally displaced manner consists of a part of a linkage assembly which is employed to actuate the carriage. The link 132 is pivoted as previously described, while the link or lever 134 is pivoted at its lower end to a brace 136 which helps to support the rail 24 and specifically the rail leg base or frame. Accordingly, the link 132 of the linkage assembly is pivoted intermediate the ends of said link 134. An operating handle 138 is pivoted to the outer end of the lever or link 134 and has a convenient handle 140 at the end thereof.

Figure 2:
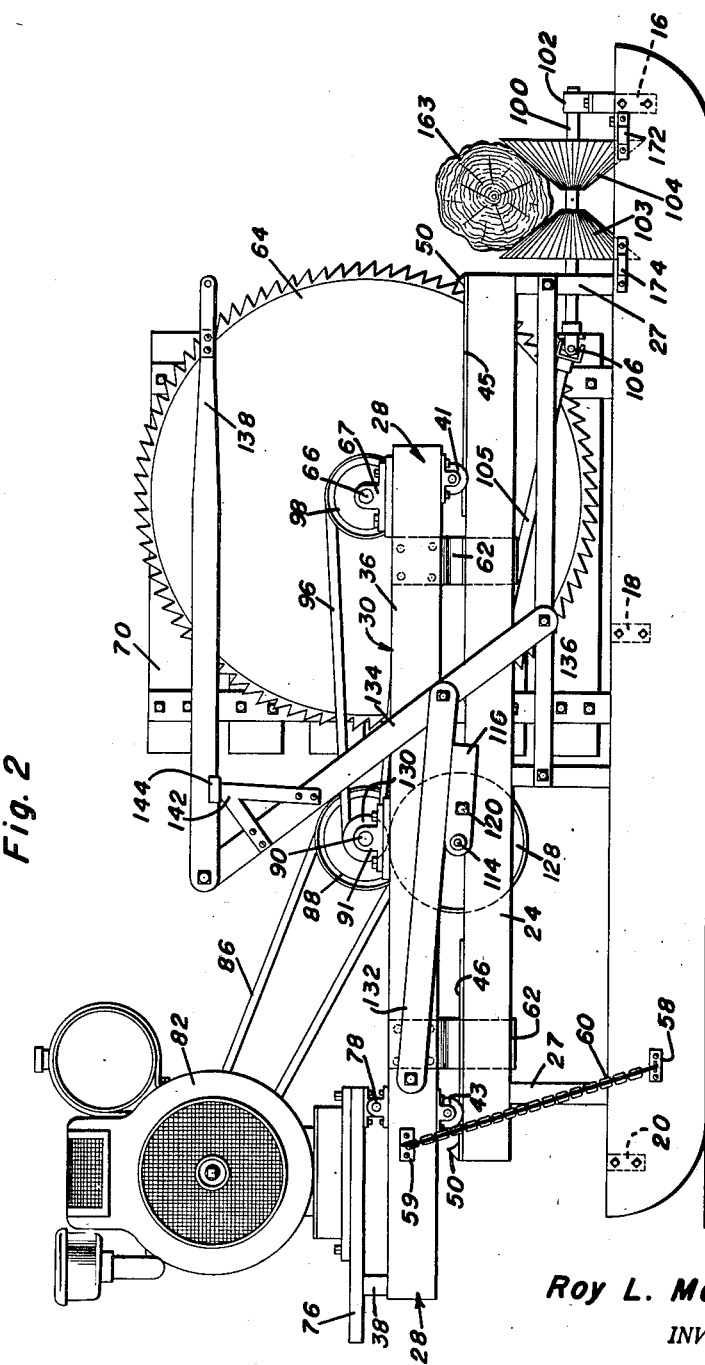
Figure 2 is a side view of the device with the carriage moved rearwardly, this being the position that the feed mechanism is operative, while the saw is moved sufficiently so as to allow the log to be moved into the normal path of travel of the saw blade.

When the linkage assembly is disposed as in Figure 2, in order to hold the handle 138 in the horizontal position, a support 142 is called into play. This support is fixed to the link 134 and has a cradle 144 at the upper end thereof forming a seat for said handle 138.

Reference to Figure 3 discloses that the logs are adapted to be fed transversely of the normal path of travel of the carriage. Forming a part of the feed mechanism or assembly for the stock is a detachable bed 150. This bed consists of a pair of parallel sides 152 and 154 which are held in spaced relationship by means of a horse 156 (Figure 4) to thereby form a trackway for the carriage 158.

This carriage consists of side plates 160 and 162 which have a block 164 with a recess therein to form a cradle for the log 163 (Figure 5). Flanged wheels 166 are mounted on axles 167 and 168 which extend through the side plates 160 and 162 and which are operable on the straps 168 and 169, the straps being disposed on and forming a part of the sides 152 and 154.

The inner ends of the sides 152 and 154 have pins depending therefrom which are disposed in the brackets 172 and 174 (Figure 3), carried by the runner 12.

The general operation of the apparatus is as follows: A log 163 is disposed on the small vehicle 158 and pushed forwardly until the forward end thereof engages the rollers 103 and 104. The carriage is moved rearwardly until it is about half way between the front and rear limit of its travel or until such time that the blade 64 is out of the path of movement of the log 163. The engine 82 is started thereby causing through the belting, operation of the saw blade 64.

Then the link assembly is operated rearwardly causing the carriage to move to the rearmost position and the rotating member 128 and element 130 to come into contact with each other. At that time the laterally displaceable shaft 114 has raised slightly, but not enough to cause disengagement of the gears 110 and 112. This insures firm contact between the rotating member and element.

Due to this transmission of power, the rollers 103 and 104 are caused to operate thereby pulling the log 163 transversely of the carriage. When the log has moved a sufficient amount, the linkage assembly is operated by pulling it forward thereby pulling the entire carriage forward and hence, cutting the log. When the carriage is moved forward initially, the rotating member and element become separated from each other so that the rollers 103 and 104 no longer are operative. At the time that the log is cut, the apparatus is in readiness for another complete cycle of operation.

Having described the invention, what is claimed as new is:

1. In a log sawing machine, the combination with an elongated base, log feeding means on said base for feeding a log across the base including an operating shaft, a saw carriage on the base having a rotary saw thereon and movable to advance and retract the same and the saw relative to the log, and a power drive on said carriage for said saw, of a manually operative link assembly pivoted on said base and carriage and operative to advance and retract the saw and carriage, and a friction drive for said shaft comprising a rotary friction driving member on the carriage driven by said power means and advanced and retracted by and with said carriage, a friction driven rotary member operatively connected to the shaft, means pivotally mounting said friction driven member on the base for swinging into engagement with the friction driving member when the carriage, saw and friction driving member are retracted, said link assembly including a part engaging and swinging said means when the carriage, saw and friction driving member are retracted.

2. The combination according to claim 1, said means comprising an arm pivoted on said base, said part comprising a link in said assembly pivoted to said carriage and swingable into engagement with said arm to pivot said arm.

ROY L. MERRY.

REFERENCES CITED

The following references are of record in the file of this patent:

UNITED STATES PATENTS

| Number | Name | Date |
|---|---|---|
| 410,777 | Abbott | Sept. 10, 1889 |
| 632,640 | Butterfield | Sept. 5, 1899 |
| 909,454 | Pye | Jan. 12, 1909 |
| 2,039,017 | McLeod | Apr. 28, 1936 |
| 2,410,887 | Locke | Nov. 12, 1946 |
| 2,480,536 | Andrus | Aug. 30, 1949 |